US012801146B2

(12) United States Patent
Tsuno et al.

(10) Patent No.: US 12,801,146 B2
(45) Date of Patent: Nov. 17, 2026

(54) REMOTE OPERATION DEVICE, VIDEO PRESENTATION METHOD, AND STORAGE MEDIUM

(71) Applicant: HONDA MOTOR CO., LTD., Tokyo (JP)

(72) Inventors: Koichi Tsuno, Wako (JP); Ryota Hisada, Tokyo (JP); Shinji Oka, Wako (JP); Yoko Saito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 138 days.

(21) Appl. No.: 18/897,660

(22) Filed: Sep. 26, 2024

(65) Prior Publication Data

US 2025/0021104 A1 Jan. 16, 2025

Related U.S. Application Data

(63) Continuation of application No. PCT/JP2022/015057, filed on Mar. 28, 2022.

(51) Int. Cl.
*G05D 1/224* (2024.01)
*G05D 1/69* (2024.01)
*G05D 111/10* (2024.01)

(52) U.S. Cl.
CPC ............. *G05D 1/2247* (2024.01); *G05D 1/69* (2024.01); *G05D 2111/10* (2024.01)

(58) Field of Classification Search
CPC .... G05D 1/2247; G05D 1/69; G05D 2111/10; G05D 1/2249; G05D 2105/28; G05D 2107/90; G05D 2109/10; E02F 9/20; E02F 9/26; H04N 7/18
See application file for complete search history.

(56) References Cited

U.S. PATENT DOCUMENTS 9,881,501 B2 * 1/2018 Weber .............. G08G 1/096716
10,163,348 B2 * 12/2018 Ichikawa .................. B60R 1/24
11,688,162 B2 * 6/2023 Ichikawa .................. B60R 1/24
348/118
(Continued)

FOREIGN PATENT DOCUMENTS

JP 2014-102743 A 6/2014
JP 2018-173755 A 11/2018
(Continued)

OTHER PUBLICATIONS

International Search Report dated Jun. 21, 2022, issued in counterpart International application No. PCT/JP2022/015057, with English translation. (2 pages).
(Continued)

*Primary Examiner* — Bhavesh V Amin
(74) *Attorney, Agent, or Firm* — WHDA, LLP

(57) ABSTRACT

A remote operation device for enabling a user to remotely operate a work machine includes a visibility determination unit configured to determine visibility of a work area where the work machine is located, a display determination unit configured to determine, based on the visibility of the work area, one or more support displays to be superimposed on a video of the work area captured by the work machine, and a presentation unit configured to present, to the user, the video of the work area on which the one or more support displays are superimposed.

9 Claims, 7 Drawing Sheets

(56) References Cited

U.S. PATENT DOCUMENTS

| | | | | |
|---|---|---|---|---|
| 2001/0028060 | A1* | 10/2001 | Yamazaki | G09G 3/3233 257/E29.279 |
| 2014/0139672 | A1* | 5/2014 | Murashita | G06T 5/90 348/148 |
| 2014/0172296 | A1* | 6/2014 | Shtukater | G01C 21/3647 701/408 |
| 2015/0187214 | A1* | 7/2015 | Ichikawa | B60R 1/24 348/118 |
| 2017/0124870 | A1* | 5/2017 | Weber | G08G 1/096783 |
| 2017/0228606 | A1* | 8/2017 | Guan | G06T 7/90 |
| 2018/0088323 | A1* | 3/2018 | Bao | G02B 27/017 |
| 2018/0286233 | A1* | 10/2018 | Suzuki | B60K 35/22 |
| 2021/0286502 | A1* | 9/2021 | Lemay | G06F 3/011 |
| 2022/0214689 | A1* | 7/2022 | Pavlica | B63B 79/15 |
| 2022/0308345 | A1* | 9/2022 | Morita | B60K 35/10 |
| 2023/0306695 | A1* | 9/2023 | Rockel | G06T 19/006 |
| 2025/0377760 | A1* | 12/2025 | Mckenzie | G06F 3/013 |

FOREIGN PATENT DOCUMENTS

| | | |
|---|---|---|
| JP | 2020-204900 A | 12/2020 |
| JP | 2021-114757 A | 8/2021 |

OTHER PUBLICATIONS

International Preliminary Report on Patentability (Form PCT/IB/373) issued in counterpart International application No. PCT/JP2022/015057 mailed Jun. 22, 2022 with Form PCT/ISA/237, with English translation. (9 pages).

* cited by examiner

FIG. 5

306

SECONDARY STORAGE DEVICE

500

501 502

| WORK AREA ID | VISIBILITY RANK |
|---|---|
| AAA | HIGH |
| BBB | MEDIUM |
| CCC | LOW |
| ... | ... |

510

511 512

| SUPPORT DISPLAY TYPE | VISIBILITY RANK |
|---|---|
| ROUTE | MEDIUM, LOW |
| SPEED | ALL |
| DISTANCE | LOW |
| ROAD WIDTH | LOW |
| DUST FORECAST | LOW |
| ACCIDENT CAUTION | MEDIUM, LOW |
| ANIMAL CAUTION | MEDIUM, LOW |
| CAUTION ON PASSING | MEDIUM, LOW |
| OBSTACLE CAUTION | MEDIUM, LOW |
| VIRTUAL TRAFFIC SIGNAL | MEDIUM, LOW |
| VIRTUAL SIGN | ALL |
| ... | ... |

REMOTE OPERATION DEVICE, VIDEO PRESENTATION METHOD, AND STORAGE MEDIUM

CROSS-REFERENCE TO RELATED APPLICATION(S)

This application is a continuation of International Patent Application No. PCT/JP2022/015057 filed on Mar. 28, 2022, the entire disclosures of which is incorporated herein by reference.

BACKGROUND OF THE INVENTION

Field of the Invention

The present invention relates to a remote operation device, a video presentation method, and a storage medium.

Description of the Related Art

A technique is known that displays a video captured by a work machine on a remote operation device to enable a user to remotely operate the work machine using the remote operation device. Japanese Patent Laid-Open No. 2020-204900 describes a technique for changing the way of displaying display information corresponding to an operation target on an operation screen based on a peripheral situation of a moving target. To support the work by the user, various support displays are superimposed on the video captured by the work machine. If the number of support displays is too large, it is difficult to see the video captured by the work machine, which may deteriorate the operability of the remote operation device. On the other hand, if the number of support displays is too small, the user cannot be sufficiently supported, which may also deteriorate the operability of the remote operation device.

SUMMARY OF THE INVENTION

An aspect of the present disclosure provides a technique for improving the operability of the remote operation device.

According to some embodiments, a remote operation device for enabling a user to remotely operate a work machine, the remote operation device comprising: a visibility determination unit configured to determine visibility of a work area where the work machine is located; a display determination unit configured to determine, based on the visibility of the work area, one or more support displays to be superimposed on a video of the work area captured by the work machine; and a presentation unit configured to present, to the user, the video of the work area on which the one or more support displays are superimposed is provided.

Further features of the present invention will become apparent from the following description of exemplary embodiments with reference to the attached drawings.

BRIEF DESCRIPTION OF THE DRAWINGS

The accompanying drawings are included in the specification, constitute a part of the specification, illustrate an embodiment of the present invention, and are used together with the description to describe the principle of the present invention.

FIG. 5 is a diagram illustrating an example of information used by the remote operation device according to some embodiments;

DESCRIPTION OF THE EMBODIMENTS

Figure 1:
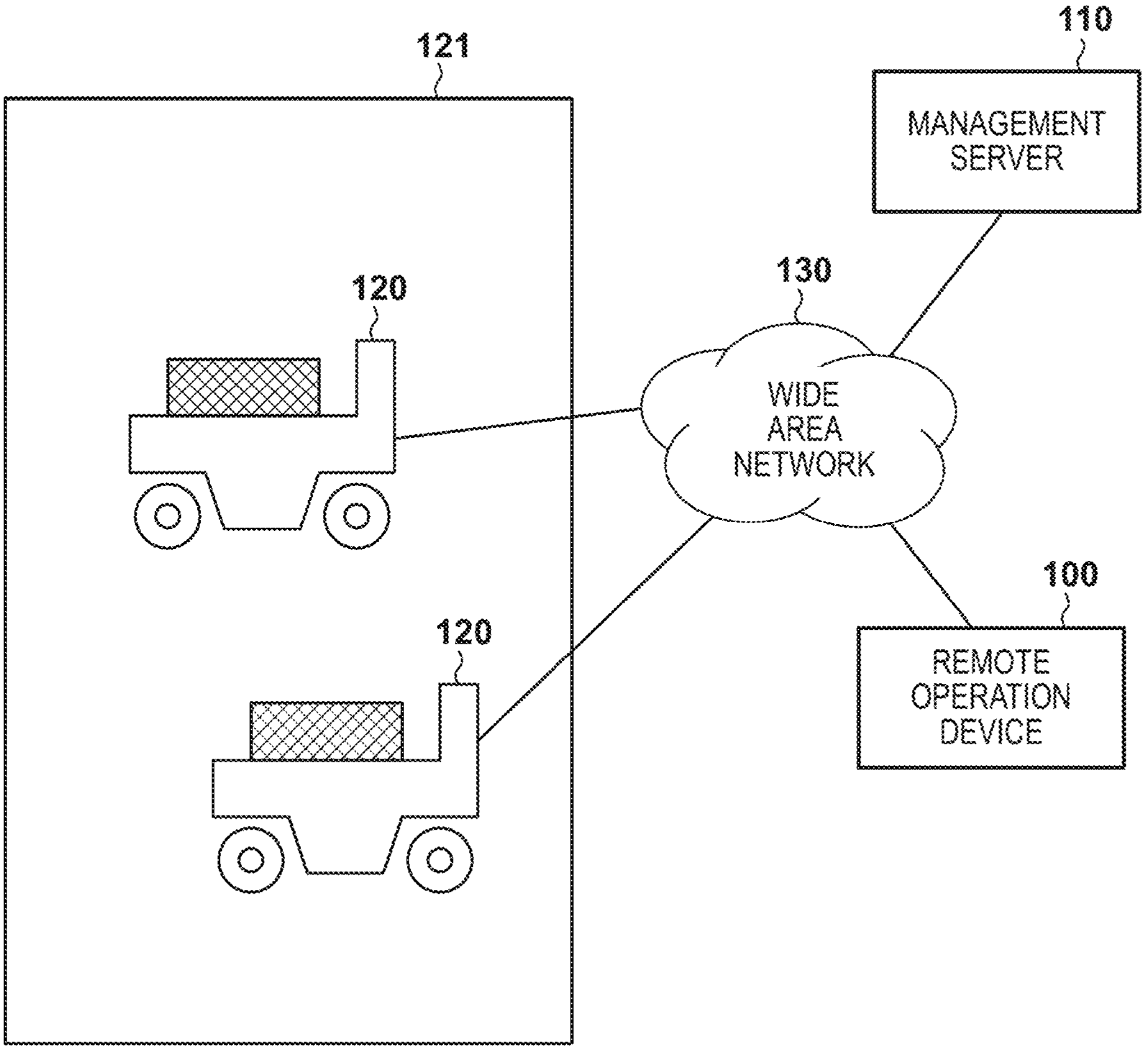
FIG. 1 is a schematic diagram illustrating a configuration example of a remote operation system according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

A configuration example of a remote operation system according to some embodiments will be described with reference to FIG. 1. In the embodiment of FIG. 1, the remote operation system includes, for example, a remote operation device 100, a management server 110, and a work machine 120. These components can communicate with each other over a wide area network 130 such as the Internet. Alternatively, at least some of these components may be able to communicate through a local area network.

The work machine 120 is a machine that performs work in a work area 121. The work machine 120 may be a work machine that can travel, a work machine that can move by other methods (can fly, for example), or a work machine that cannot move (that is, performs work in the same place). The work performed by the work machine may be anything, which may include transportation work, ground leveling work, water discharge work, and the like. The work machine 120 that performs the work in the work area 121 is only one or in a plural number. Hereinafter, a case where the work machine 120 is a work machine that can travel will be described. However, the following description is similarly applicable to a case where the work machine 120 is a work machine that cannot travel.

The remote operation device 100 is a device for a user of the remote operation device 100 to remotely operate the work machine 120. One work machine 120 may be operated by one remote operation device 100, or a plurality of work machines 120 may be switched from each other and operated by one remote operation device 100. The operation of the work machine 120 by the remote operation device 100 may be any operation, which may include, for example, traveling of the work machine 120. Specifically, the remote operation device 100 may acquire a parameter related to the operation of the work machine 120 (for example, a steering angle, an accelerator pedal opening angle, and a brake pedal opening angle) from the user and transmit the parameter to the work machine 120. The work machine 120 may be operable according to the operation parameter received from the remote operation device 100. The user of the remote operation device 100 may also be referred to as an operator of the work machine 120.

The management server 110 is a server for managing the work machine 120. The management server 110 may collect and store, for example, information obtained by the work machine 120. For example, the management server 110 may collect and store a travel history of the work machine 120. Furthermore, the management server 110 may acquire information on the work area 121 by analyzing an image captured by an imaging device of the work machine 120.

Figure 2:
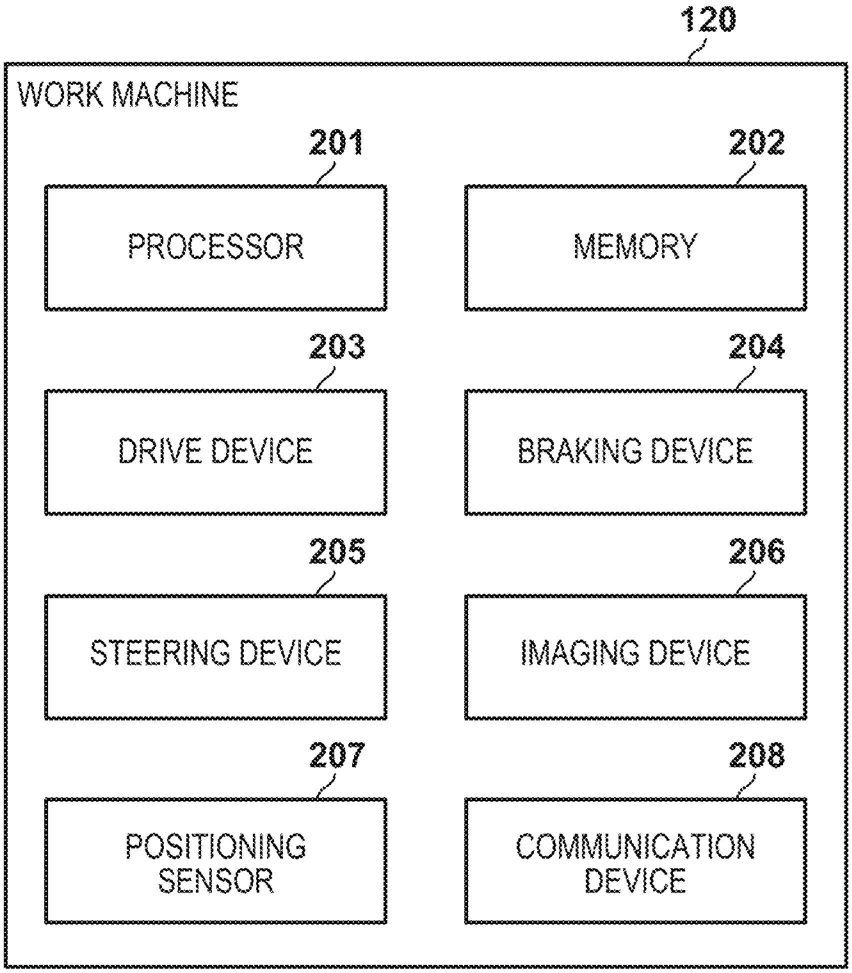
FIG. 2 is a block diagram illustrating a hardware configuration example of a work machine according to some embodiments.

A hardware configuration example of the work machine 120 will be described with a reference to FIG. 2. The work machine 120 may have a hardware component illustrated in FIG. 2. A processor 201 controls an overall operation of the work machine 120. The processor 201 may be configured by, for example, a central processing unit (CPU). The processor 201 may be a single processor, or may be a set of a plurality of processors connected to communicate with each other. A memory 202 stores programs and data used for processing of the work machine 120. The memory 202 may be, for example, a combination of a random-access memory (RAM) and a read-only memory (ROM).

A drive device 203 is a device for driving the work machine 120, and may be, for example, an engine or a motor. A braking device 204 is a device for braking the work machine 120, and may be, for example, a disc brake. A steering device 205 is a device for changing the traveling direction of the work machine 120, and may be, for example, a tie rod, a steering knuckle, a steering arm, or the like.

An imaging device 206 is a device for imaging the surroundings of the work machine 120 (for example, a front area), and may be, for example, a camera. The work machine 120 may include only one imaging device 206 or a plurality of imaging devices. A positioning sensor 207 is a sensor for measuring the geographical position of the work machine 120, and may be, for example, a global navigation satellite system (GNSS) sensor. A communication device 208 is a device for communicating with a device outside the work machine 120. The communication device 208 may be a wireless communication module including an antenna and a baseband processing circuit for performing wireless communication.

Figure 3:
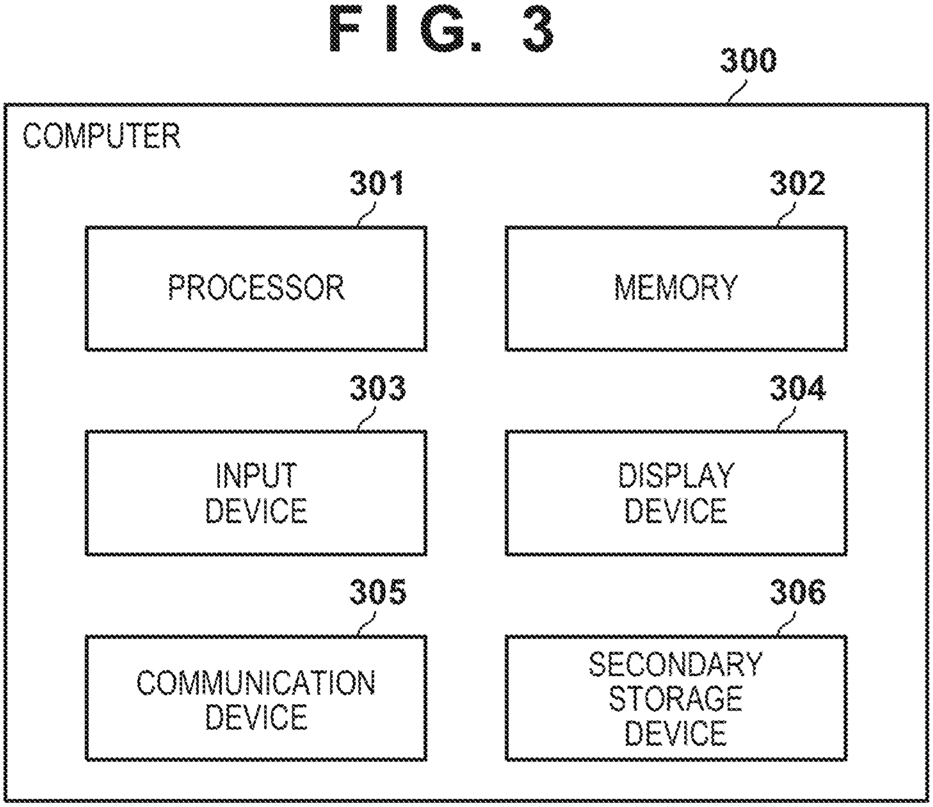
FIG. 3 is a block diagram illustrating a hardware configuration example of a computer according to some embodiments.

A hardware configuration example of a computer 300 for implementing the remote operation device 100 and the management server 110 in FIG. 1 will be described with reference to FIG. 3. The computer 300 may have hardware components illustrated in FIG. 3. A processor 301 controls an overall operation of the computer 300. The processor 301 may include, for example, a CPU. The processor 301 may be a single processor, or may be a set of a plurality of processors connected to communicate with each other. A memory 302 stores programs and data used for processing of the computer 300. The memory 302 may be configured by, for example, a combination of a RAM and a ROM.

An input device 303 is a device for acquiring an instruction from a user of the computer 300. The input device 303 may be, for example, a combination of one or more of a keyboard, a button, a touch pad, and a microphone. In a case where the remote operation device 100 is implemented by the computer 300, the input device 303 may include a handle, a joystick, an accelerator pedal, a brake pedal, and the like. A display device 304 is a device for visually presenting information to the user of the computer 300. The display device 304 may be, for example, a dot matrix display such as a liquid crystal display. The computer 300 may have a device (for example, the touch screen) in which the input device 303 and the display device 304 are integrally formed.

A communication device 305 is a device for communicating with a device outside the computer 300. In a case where the computer 300 performs wired communication, the communication device 305 may be a network interface card (NIC) having a connector for connecting a cable. In a case where the computer 300 performs wireless communication, the communication device 305 may be a wireless communication module including an antenna and a baseband processing circuit.

A secondary storage device 306 is a device for storing data used for processing of the computer 300 in a nonvolatile manner. The secondary storage device 306 is, for example, a hard disk drive (HDD) or a solid-state drive (SSD).

Figure 4:
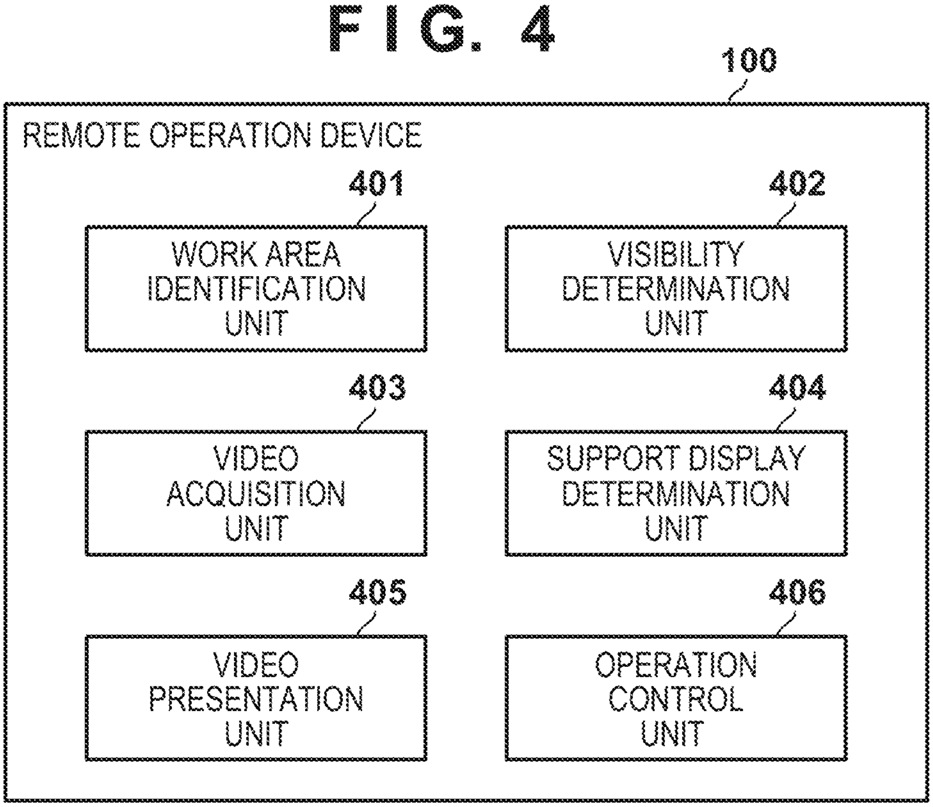
FIG. 4 is a block diagram illustrating a functional configuration example of a remote operation device according to some embodiments.

A functional configuration example of the remote operation device 100 in FIG. 1 will be described with reference to FIG. 4. FIG. 4 illustrates a function for the user of the remote operation device 100 to remotely operate the work machine 120. The remote operation device 100 may have other functions. In the following description, the user of the remote operation device 100 is simply referred to as a user. Each functional block of the remote operation device 100 may be realized by the processor 301 of the remote operation device 100 operating according to commands of programs stored in the memory 302 of the remote operation device 100. Alternatively, some or all of the functional blocks in FIG. 4 may be realized by a dedicated circuit such as an application specific integrated circuit (ASIC).

The work area identification unit 401 identifies the work area 121 where the work machine 120 to be operated is currently located. In the following description, unless otherwise specified, the work machine 120 operated by the user of the remote operation device 100 is simply referred to as the work machine 120. In addition, in the following description, unless otherwise specified, the work area 121 where the work machine 120 operated by the user of the remote operation device 100 is currently located is simply referred to as the work area 121 of the work machine 120. The work area identification unit 401 may identify the work area 121 based on, for example, the geographical position of the work machine 120 measured by the positioning sensor 207 of the work machine 120 and information indicating the range of each work area 121. The information indicating the range of each work area 121 may be set in advance by, for example, an administrator of the remote operation system and stored in the secondary storage device 306 of the remote operation device 100. Alternatively, the work area identification unit 401 may identify the work area 121 by inquiring the management server 110. In this case, the management server 110 may manage the work area 121 of each of the plurality of work machines 120 to be managed.

The visibility determination unit 402 determines the visibility of the work area 121 where the work machine 120 is located. The visibility of the work area 121 may be determined based on visibility information set by preliminary investigation. The visibility information is information indicating the visibility of the work area 121. The visibility of the work area 121 is an index indicating how far the user can see the surroundings of the work machine 120 (for example, the front area) at the time of remote operation. Visibility information 500 will be described as an example of the visibility information with reference to FIG. 5. In the example of FIG. 5, the visibility information 500 is stored in a table format. However, the visibility information may be stored in other forms. The visibility information 500 has a record for each work area.

A column 501 ("work area ID") represents information identifying an individual work area 121. A work area ID is assigned in advance by the administrator to the work area 121 managed by the management server 110. A column 502 ("visibility rank") represents the visibility of the individual work area 121. In the example of FIG. 5, the visibility of the work area 121 is classified into three visibility ranks of "high", "medium", and "low". Alternatively, the visibility may be classified into a plurality of other ranks. In the area having the visibility of "high", a farther or wider range can be seen than in the area having the visibility of "low". The visibility determination unit 402 may determine the visibility of the work area 121 of the work machine 120 by selecting one of these three visibility ranks. The visibility of the work area 121 may be determined based on various factors. For example, in a case where the ground of the work area 121 is sand where it tends to become dusty, the visibility may be low. In addition, in a case where there are many obstacles in the work area 121, the visibility may be low.

The visibility information 500 may be stored in the management server 110 (specifically, the secondary storage device 306). The visibility determination unit 402 may determine the visibility of the work area 121 by inquiring the management server 110. Alternatively or additionally, the visibility information 500 may be stored in the remote operation device 100 (specifically, the secondary storage device 306). In this case, the visibility determination unit 402 may determine the visibility of the work area 121 by referring to the secondary storage device 306 of the remote operation device 100.

In some embodiments, the visibility determination unit 402 may determine the visibility of the work area 121 based on the current status of the work area 121 of the work machine 120. For example, the visibility determination unit 402 may determine that the visibility is lower in a case where the current time zone is nighttime than in a case where the current time zone is daytime. In this case, the visibility determination unit 402 may acquire the time when an on-site video was captured from the work machine 120 together with the on-site video. In addition, in a case where the weather of the work area 121 is bad weather (for example, rain, snow, fog, and the like), the visibility determination unit 402 may determine that the visibility is lower than that in a case where the weather of the work area 121 is sunny. The visibility determination unit 402 may determine the weather in the work area 121 by analyzing the on-site video. Alternatively or additionally, the visibility determination unit 402 may determine the weather in the work area 121 based on weather data provided by an external server.

Figure 6:
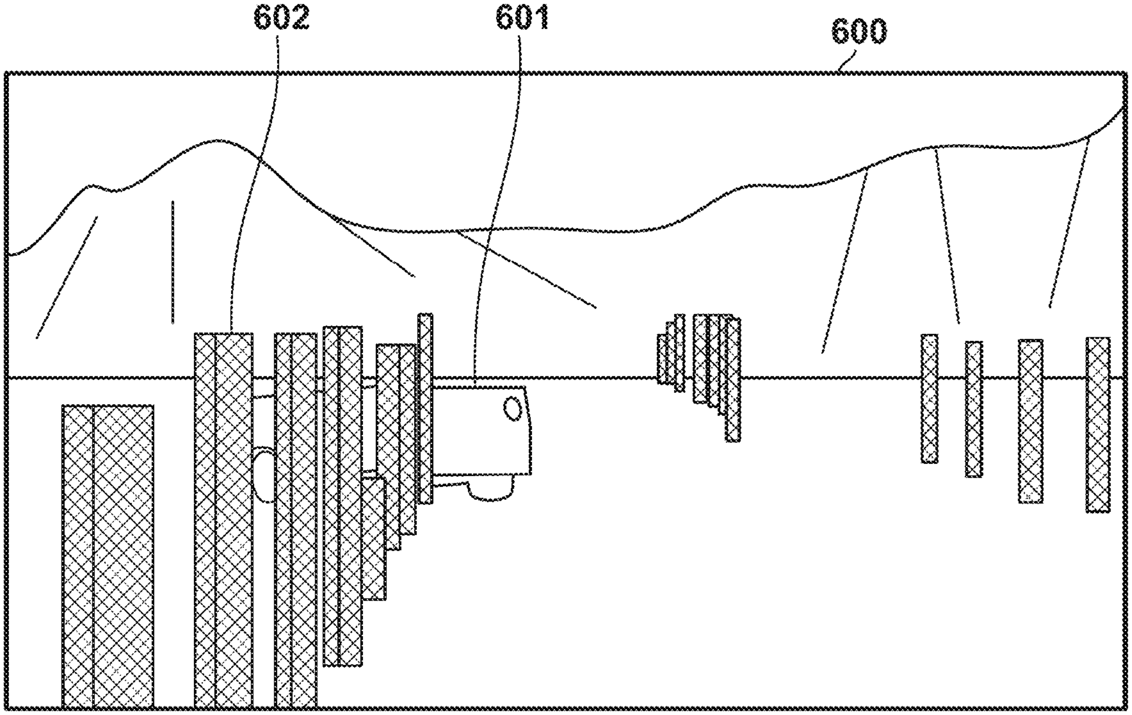
FIG. 6 is a schematic diagram illustrating an example of an on-site video according to some embodiments.

The video acquisition unit 403 acquires a video captured by the imaging device 206 of the work machine 120. Hereinafter, the video captured by the imaging device 206 of the work machine 120 is referred to as the on-site video. For example, the work machine 120 may transmit the video captured by the imaging device 206 to the remote operation device 100 in real time, and the video acquisition unit 403 may receive the video. An example of the on-site video 600 will be described with reference to FIG. 6. FIG. 6 illustrates one frame of the on-site video 600. The on-site video 600 is a video obtained by capturing the front area of the work machine 120. The on-site video 600 includes an image of another work machine 601 that is turning left in front of the work machine 120 and an image of a pile 602 that defines a road on which the work machine 120 is traveling.

The support display determination unit 404 determines one or more support displays to be superimposed on the on-site video based on the visibility of the work area 121 of the work machine 120. The support display is a display for supporting the operation of the work machine 120 by the user. The one or more support displays to be superimposed on the on-site video may be determined based on support display information determined in advance. The support display information is information indicating a support display type and a visibility rank associated therewith. Support display information 510 will be described as an example of the support display information with reference to FIG. 5. The support display information 510 indicates a plurality of support displays that can be superimposed on the on-site video. The support display determination unit 404 may select one or more of the plurality of support displays. In the example of FIG. 5, the support display information 510 is stored in a table format. However, the support display information may be stored in other forms. The support display information 510 has a record for each type of support display.

A column 511 ("support display type") represents the type of an individual support display. A support display related to "route" may be a display of a planned travel route of the work machine 120. The planned travel route of the work machine 120 may be a route on which the work machine 120 should travel to perform work. The route on which the work machine 120 should travel to perform the work may be determined by the remote operation device 100 or another device based on a work plan of the work machine 120.

A support display related to "speed" may be a display related to the moving speed of the work machine 120. The display related to the moving speed of the work machine 120 may be, for example, the upper limit speed of a road on which the work machine 120 is traveling. The upper limit speed may be a legal upper limit speed or an upper limit speed set by the administrator of the work area 121. The upper limit speed of the road on which the work machine 120 is traveling may be set according to the traveling environment of the work machine 120. For example, in a case where the visibility is poor due to dust or rain, or in a case where a road surface condition is poor due to rain or snow, an upper limit speed lower than that in a normal condition may be set. Alternatively or additionally, the upper limit speed of the road on which the work machine 120 is traveling may be set according to the state of the work machine 120. For example, in a case where the weight of a cargo carried by the work machine 120 is heavy or fragile, a lower upper limit speed may be set than that in other cases.

A support display related to "distance" may be a display of a distance from the work machine 120 to a target. The display of the distance from the work machine 120 to the target may include, for example, a distance to a preceding vehicle, a distance to a surrounding obstacle, and the like. The distance from the work machine 120 to the target may be measured, for example, by the work machine 120 and provided to the remote operation device 100.

A support display related to "road width" may be a display of the width of a road on which the work machine 120 is traveling. The width of the road on which the work machine 120 is traveling may be determined based on, for example, map information of the work area 121.

A support display related to "dust forecast" may be a display of an area of dust generation. The area of dust generation may be an area where dust is currently generated or an area where dust has been generated at a predetermined frequency (for example, three or more days per week) in the past. The area where dust is currently generated may be determined based on information (for example, video) obtained by any of the work machines 120 located in the work area 121. The area where dust is generated may be determined by analyzing the on-site video. Alternatively or additionally, the area where dust is generated may be determined based on weather data provided by the external server.

The administrator of the remote operation system may identify an area where dust is likely to be generated through preliminary investigation and store the information in, for example, the secondary storage device 306 of the management server 110.

A support display related to "accident caution" may be a display for calling attention to an accident. For example, the management server 110 may identify a point where the work machine 120 performed sudden braking based on the travel histories of the plurality of work machines 120 (the history of the braking device 204, or the like), and the support display determination unit 404 may identify a point where an accident is likely to occur based on this information.

A support display related to "animal caution" may be a display for calling attention to the appearance of an animal. The attention to the appearance of the animal may be a caution that the animal is currently appearing, or may be a caution that the animal has appeared at a predetermined frequency (for example, one or more days per week) in the past. The area where the animal is currently appearing may be determined based on information (for example, video) obtained by any of the work machines 120 located in the work area 121. The administrator of the remote operation system may identify an area where the animal is likely to appear through preliminary investigation and store the information in the secondary storage device 306 of the management server 110, for example.

A support display related to "caution on passing oncoming work machine" may be a display for calling attention to passing another oncoming work machine. The other work machine subject to the attention to passing the oncoming work machine may be a work machine traveling while facing the work machine 120 to be operated. In addition, the other work machine subject to the attention to passing the oncoming work machine may be a large-sized work machine having a difficulty passing the work machine 120 to be operated. The work machine traveling while facing the work machine 120 to be operated may be recognized by analyzing the on-site video received from the work machine 120, or may be notified by the management server 110 that manages the position of each work machine 120 in the work area 121.

A support display related to "obstacle caution" may be a display for calling attention to an obstacle present around the work machine 120. The obstacle around the work machine 120 is, for example, the pile 602 included in the on-site video 600 of FIG. 6. The obstacle around the work machine 120 may be recognized by analyzing the on-site video received from the work machine 120, or may be recognized based on the map information.

A support display related to "virtual traffic signal" may be a display of a virtual traffic signal. The virtual traffic signal is a traffic signal that is not actually installed in the work area and is included in the video presented to the user. The virtual traffic signal is used to control traffic of the plurality of work machines (which may include the work machine 120 to be operated) in the work area 121. For example, the virtual traffic signal is arranged at an intersection included in the work area 121. By displaying the virtual traffic signal in this manner, it is possible for the user to perform travel in coordination with other work machines even in a case where the visibility of the work area 121 is low.

For example, in a case where another work machine is passing an intersection in front of the work machine 120, the support display determination unit 404 may present a virtual traffic signal that is a yellow light to the user of the work machine 120. At the same time, the support display determination unit 404 may determine to present a button for instructing the user to decelerate the work machine, as the support display, to the user. Thereafter, in a case where the work machine 120 does not decelerate, the support display determination unit 404 may determine to present a virtual traffic signal that is a red light to the user of the work machine 120. At the same time, the support display determination unit 404 may determine to present a button for instructing the user to stop the work machine, as the support display, to the user. The button for instructing the user to stop the work machine may be highlighted compared to the above-described button for instructing the user to decelerate the work machine. In the display of the virtual traffic signal, the traveling status of other work machines may be recognized by analyzing the on-site video of the work machine 120, or may be notified by the management server 110 that manages the position of each work machine 120 in the work area 121.

The virtual traffic signal may be displayed at a specific position (for example, an intersection or the like) in the work area, or may be displayed based on the status of the work machine 120. For example, in a case where an inter-vehicle distance between the work machine 120 and the preceding vehicle becomes equal to or less than a threshold (for example, 50 meters), the support display determination unit 404 may display the virtual traffic signal that is a yellow light in front of the work machine 120. At the same time, the support display determination unit 404 may determine to present a button for instructing the user to decelerate the work machine, as the support display, to the user. Thereafter, in a case where the work machine 120 does not decelerate, the support display determination unit 404 may determine to present the virtual traffic signal that is a red light to the user of the work machine 120. Alternatively, in a case where the inter-vehicle distance between the work machine 120 and the preceding vehicle becomes equal to or less than a threshold different from the above threshold (for example, 25 meters), the support display determination unit 404 may determine to present the virtual traffic signal that is the red light to the user of the work machine 120. At the same time, the support display determination unit 404 may determine to present a button for instructing the user to stop the work machine, as the support display, to the user. The button for instructing the user to stop the work machine may be highlighted compared to the above-described button for instructing the user to decelerate the work machine.

A support display related to "virtual sign" may be a display of a virtual sign. The virtual sign is a sign that is not actually installed in the work area and is included in the video presented to the user. The sign may be a traffic sign. The virtual sign is used to control traffic of the plurality of work machines (which may include the work machine 120 to be operated) in the work area 121. For example, the virtual sign is arranged at an intersection included in the work area 121. By displaying the virtual sign in this manner, it is possible for the user to perform travel in coordination with other work machines even in a case where the visibility of the work area 121 is low. Furthermore, by virtually displaying a sign having the same appearance as a real sign, it is possible for the user to intuitively understand the presented support display.

A column 512 ("visibility rank") of the support display information 510 represents the visibility rank for presenting the individual support display. Each of the plurality of support displays is associated with one or more of the plurality of visibility ranks. For example, the support display related to "route" is associated with the visibility ranks of "medium" and "low". This indicates that the support display related to "route" is presented to the user in a case where the visibility of the work area 121 of the work machine 120 is "medium" or "low", and is not presented to the user in a case where the visibility of the work area 121 of the work machine 120 is "high". The support display related to "speed" is associated with all the visibility ranks. This indicates that the support display related to "speed" is presented to the user regardless of the visibility rank.

In some embodiments, a support display that virtually displays a real sign may be presented to the user most preferentially (that is, even in a case where the visibility is good). In addition, the support display related to safety such as contact with another person may be presented to the user as the second priority. For example, as described above, the plurality of support displays include a support display that virtually represents a real sign (for example, "virtual sign" in the support display information 510) and a support display for calling attention of the user (for example, "accident caution" in the support display information 510). The support display determination unit 404 may preferentially select the former of the two support displays. Specifically, in a case where the visibility rank is "high", the support display determination unit 404 selects the former support display to present it to the user, but does not need to select the latter support display to present it to the user.

Figure 7:
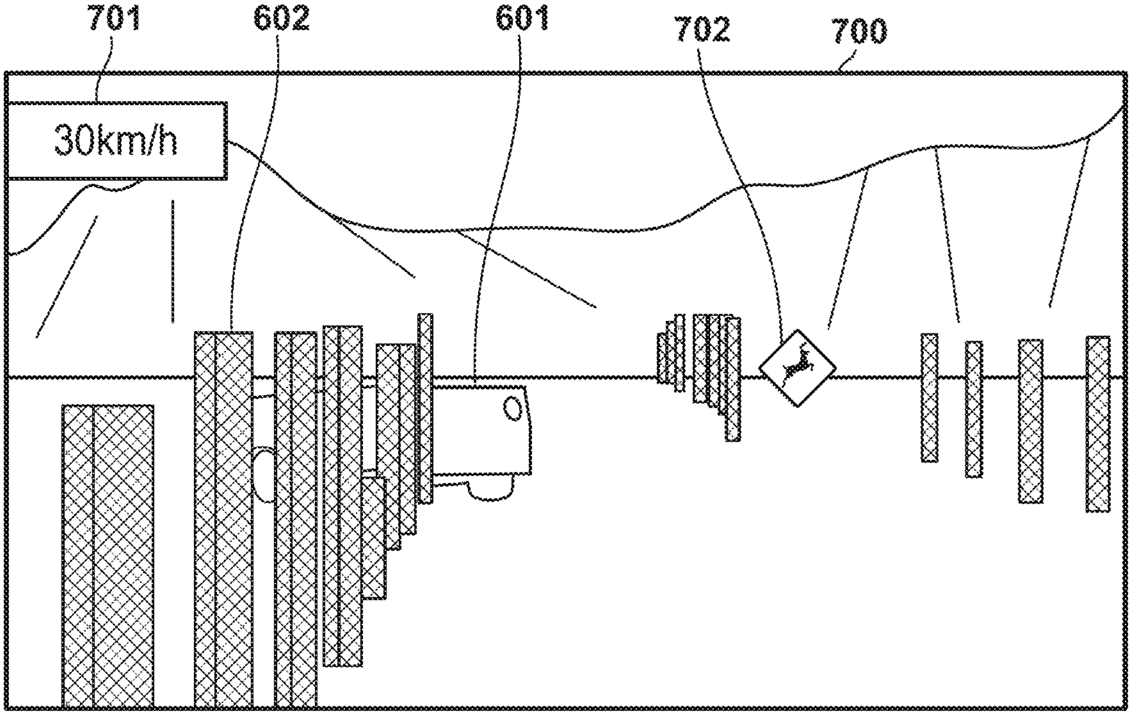
FIG. 7 is a schematic diagram illustrating an example of an operation video according to some embodiments.

The video presentation unit 405 presents the on-site video on which one or more support displays determined as described above are superimposed, to the user. Hereinafter, the on-site video on which one or more support displays are superimposed is referred to as an operation video. Referring to FIG. 7, an operation video 700 is illustrated as an example of the operation video in a case where the visibility of the work area 121 of the work machine 120 is "high". In the operation video 700, a support display 701 related to the moving speed of the work machine 120 and a support display 702 indicating a virtual sign are superimposed on the on-site video 600. The support display 701 may indicate that the speed limit is 30 km/h. The support display 702 may indicate that an animal is likely to appear in the area where the support display 702 is displayed. The support display 702 is also the support display related to "animal caution", but can be presented as a virtual sign, and thus may be regarded as the support display related to "virtual sign".

Figure 8:
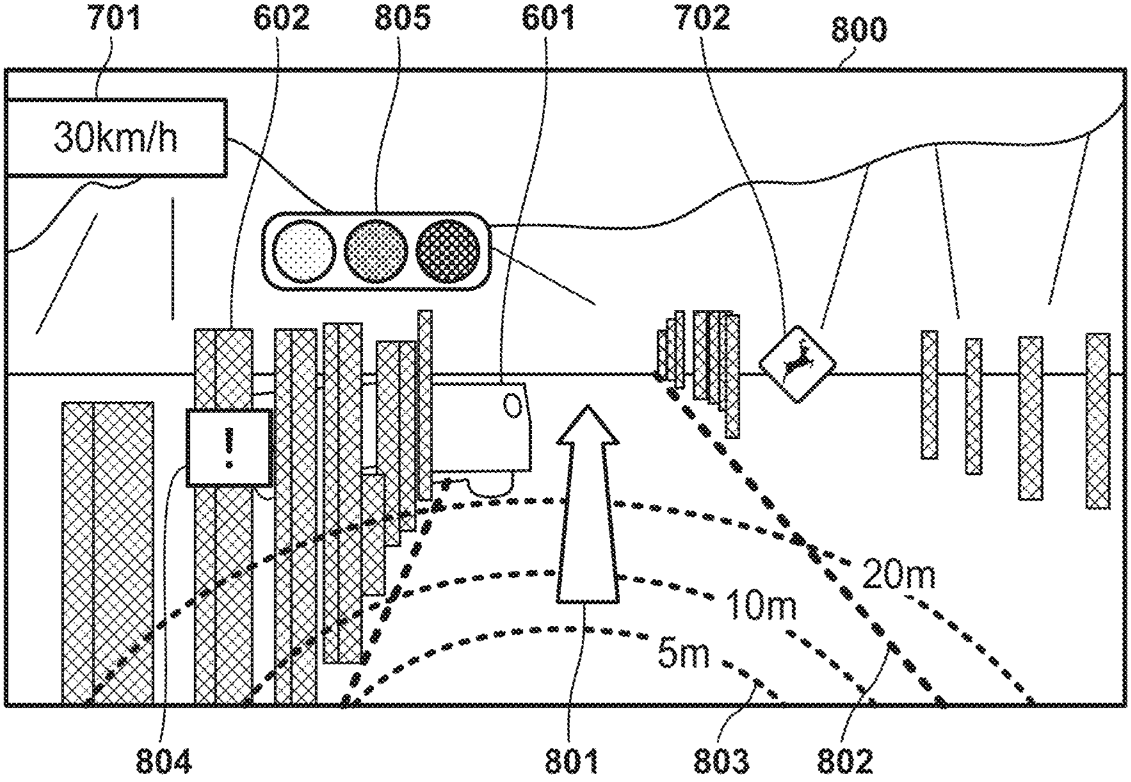
FIG. 8 is a schematic diagram illustrating an example of the operation video according to some embodiments.

Referring to FIG. 8, an operation video 800 is illustrated as an example of the operation video in a case where the visibility of the work area 121 of the work machine 120 is "low". In the operation video 800, in addition to the operation video 700, a support display 801 indicating the planned travel route of the work machine 120, a support display 802 indicating the width of the road on which the work machine 120 is traveling, a support display 803 indicating the distance from the work machine 120, a support display 804 for calling attention to the obstacle around the work machine 120, and a support display 805 indicating the virtual traffic signal are superimposed. As described above, in a case where the visibility of the work area 121 is high, few types and a small number of support displays are superimposed on the on-site video. Thus, by not presenting the information that the user can recognize from the on-site video as the support information, it is possible to suppress the user from feeling annoyance from the operation video. On the other hand, in a case where the visibility of the work area 121 is low, many types and a large number of support displays are superimposed on the on-site video. Thus, it is possible to sufficiently support the user. Therefore, the operability of the remote operation device 100 is improved. In addition, by omitting some support displays in a case where the visibility of the work area 121 is high, the processing of superimposing the support displays on the on-site video in the remote operation device 100 is reduced, and thus stable displaying of the operation video, shortening of the response time to the user input, and reduction in the time lag can be realized.

The remote operation device 100 may highlight the support display indicating another work machine, an animal, or dangerous region (an area with a bad road surface condition such as a puddle) as the work machine 120 approaches them. In addition, the remote operation device 100 may notify the user by another method such as vibration in addition to highlighting the support display.

The operation control unit 406 acquires an input for operating the work machine 120 from the user and gives instructions to the work machine 120 in response to the input. Since the operation by the operation control unit 406 may be the same as the existing operation for remotely controlling the work machine 120, detailed description thereof will be omitted.

Figure 9:
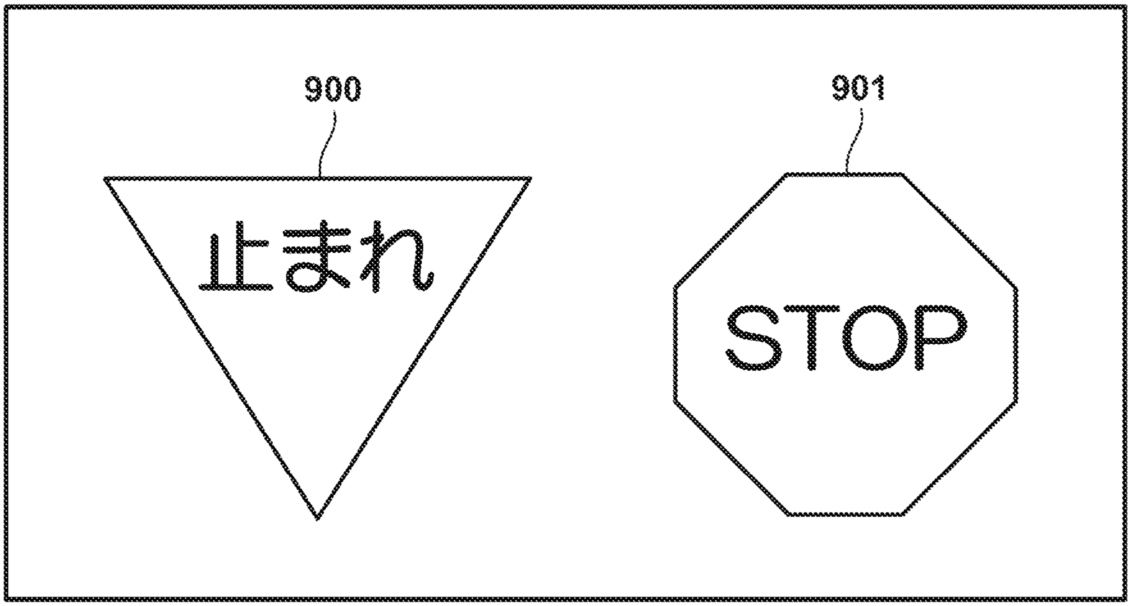
FIG. 9 is a schematic diagram illustrating an example of a virtual sign according to some embodiments.

In some embodiments, the support display of the virtual signs superimposed on the on-site video by the video presentation unit 405 may have the appearance of the sign used in the country selected by the user. Even signs that indicate the same content (for example, a stop) have different appearances for each country. For example, as illustrated in FIG. 9, a sign 900 is used in Japan and a sign 901 is used in the United States to indicate a stop. Therefore, in a case where the user designates the use of the Japanese sign, the video presentation unit 405 superimposes a virtual sign having the appearance of the Japanese sign (for example, the sign 900) on the on-site video. On the other hand, in a case where the user designates the use of the sign of the United States, the video presentation unit 405 superimposes a virtual sign having the appearance of the sign of the United States (for example, the sign 901) on the on-site video. This allows a sign having an appearance familiar to the user to be displayed, so that the user can intuitively grasp the content of the support display.

In the above-described embodiment, the visibility is set for each work area 121. Alternatively, the visibility may be set for each of a plurality of nodes set in the work area 121. The plurality of nodes may be preset by the administrator of the remote operation system. For example, a node may be set at an intersection of a road or a corner of a position in the work area 121. The visibility determination unit 402 may determine the visibility for each of the plurality of nodes set in the work area 121 where the work machine 120 is located.

Figure 10:
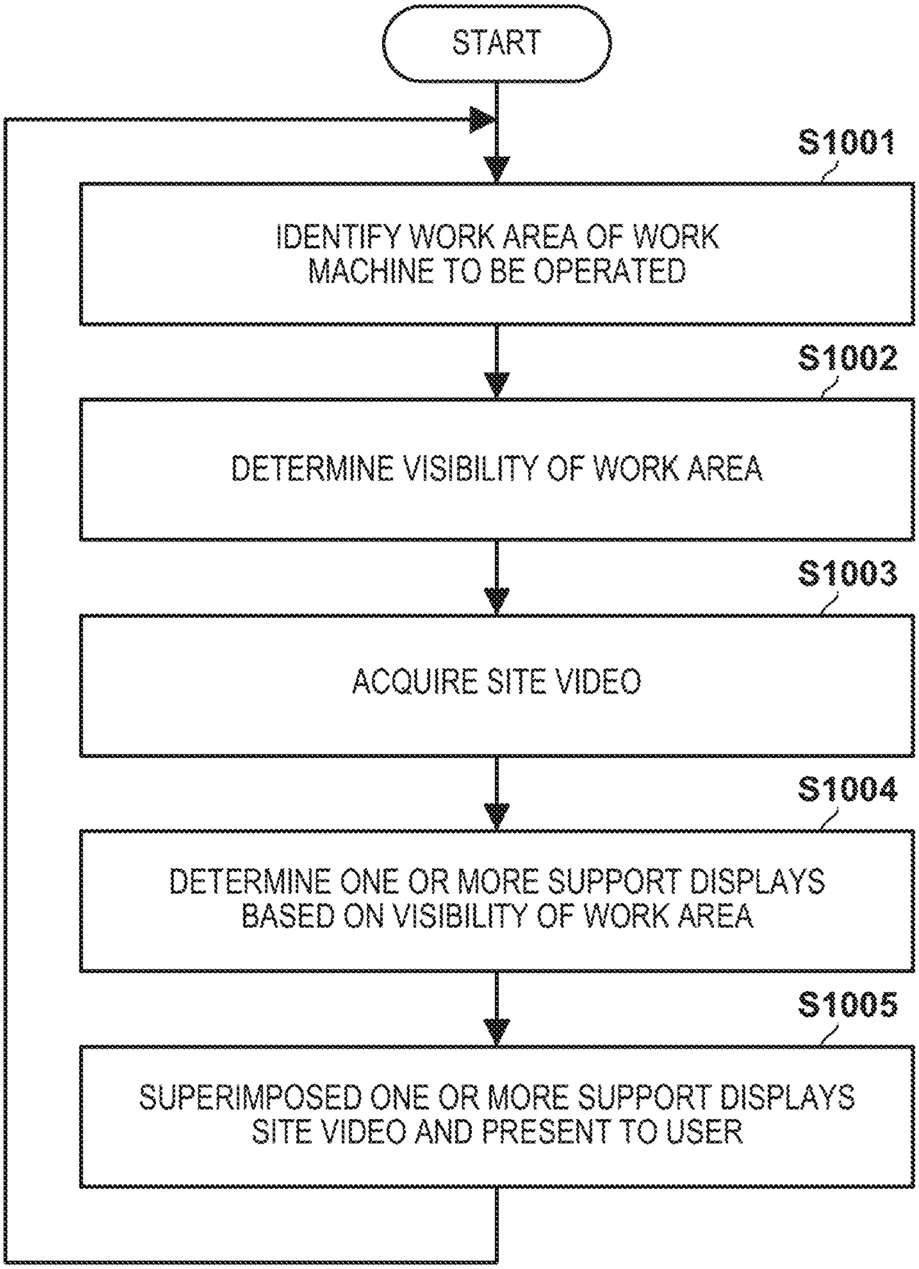
FIG. 10 is a flowchart illustrating an example of a method of presenting the operation video according to some embodiments.

An example of a method for presenting a video for operating the work machine (video presentation method) to the user of the remote operation device 100 will be described with reference to FIG. 10. Each step of the following method may be executed by the processor 301 of the remote operation device 100 operating according to commands of programs stored in the memory 302 of the remote operation device 100. Alternatively, some or all steps of the following method may be realized by a dedicated circuit such as an ASIC. The method of FIG. 10 may be started in response to an instruction to start the remote operation of the work machine 120 from the user. In parallel with the method of FIG. 10, a method for instructing the work machine 120 to perform an operation may be executed.

In S1001, the work area identification unit 401 identifies the work area 121 of the work machine 120 as described above. In S1002, the visibility determination unit 402 identifies the visibility of the work area 121 as described above. In S1003, the video acquisition unit 403 acquires the on-site video as described above. In S1004, the support display determination unit 404 determines one or more support displays to be superimposed on the on-site video based on the visibility of the work area 121, as described above. In S1005, the video presentation unit 405 presents the on-site video on which one or more support displays are superimposed (that is, the operation video described above) to the user, as described above. Thereafter, the processing returns to S1001, and the operations of S1001 to S1005 are repeated.

SUMMARY OF EMBODIMENT

<Item 1>

A remote operation device (100) for enabling a user to remotely operate a work machine (120), the remote operation device comprising:

- a visibility determination unit (402) configured to determine visibility of a work area where the work machine is located;
- a display determination unit (404) configured to determine, based on the visibility of the work area, one or more support displays (701, 702, 801-805) to be superimposed on a video (600) of the work area captured by the work machine; and
- a presentation unit (405) configured to present, to the user, the video (700, 800) of the work area on which the one or more support displays are superimposed.

According to this item, since an excessive support display for the user is not presented, the operability of the remote operation device is improved. In addition, since the excessive support display for the user is not superimposed on the on-site video, the processing load of the remote operation device is reduced. Furthermore, since the support display to be superimposed on the video of the work area is determined based on the visibility of the work area, an appropriate support display can be presented to the user.

<Item 2>

The remote operation device according to Item 1, wherein

- the display determination unit selects one visibility rank of a plurality of visibility ranks (512),
- each of a plurality of support displays (511) that can be superimposed on the video of the work area is associated with one or more of the plurality of visibility ranks, and
- the display determination unit selects the support display associated with the selected visibility rank.

According to this item, more appropriate support display can be presented to the user.

<Item 3>

The remote operation device according to Item 2, wherein

- the plurality of support displays that can be superimposed on the video of the work area include a first display (702) virtually indicating a real sign and a second display for calling attention of the user, and
- the display determination unit selects the first display and does not select the second display in one of the plurality of visibility ranks.

According to this item, since a virtual sign can be preferentially presented to the user, traveling conforming to traffic rules is performed.

<Item 4>

The remote operation device according to any one of Items 1-3, wherein

- a plurality of support displays that can be superimposed on the video of the work area include at least one or more of:
  - a display (801) of a planned travel route of the work machine;
  - a display (701) related to a moving speed of the work machine;
  - a display of an area of dust generation;
  - a display for calling attention to an accident;
  - a display for calling attention to appearance of an animal;
  - a display for calling attention to passing another oncoming work machine;
  - a display (805) of a virtual traffic signal; and
  - a display (702) of a virtual sign According to this item, a specific support display is defined.

<Item 5>

The remote operation device according to any one of Items 1-4, wherein

- a plurality of support displays that can be superimposed on the video of the work area include a display (805) of a virtual traffic signal, and
- the virtual traffic signal controls traffic of a plurality of work machines including the work machine.

According to this item, traffic of a plurality of work machines can be controlled.

<Item 6>

The remote operation device according to any one of Items 1-5, wherein

- a plurality of support displays that can be superimposed on the video of the work area include a display (900, 901) of a virtual sign, and
- the display of the virtual sign has an appearance of a sign used in a country selected by the user.

According to this item, the user can intuitively grasp the contents of the sign.

<Item 7>

The remote operation device according to any one of Items 1-6, wherein the visibility determination unit determines the visibility for each of a plurality of nodes set in the work area where the work machine is located.

According to this item, the visibility can be determined in fine units.

<Item 8>

The remote operation device according to any one of Items 1-7, wherein the work machine is a work machine that can travel.

According to this item, the user can operate traveling of the work machine.

<Item 9>

A non-transitory storage medium storing a program for causing a computer to function as the remote operation device according to any one of Items 1-8.

According to this item, the above-described item is provided in the form of a storage medium.

<Item 10>

A method for presenting a video (700, 800) for remotely operating a work machine (120) to a user, the method comprising:

determining (S1002) visibility of a work area (121) where the work machine is located;

determining (S1004), based on the visibility of the work area, one or more support displays (701, 702, 801-805) to be superimposed on a video (600) of the work area captured by the work machine; and presenting (S1005), to the user, the video (700, 800) of the work area on which the one or more support displays are superimposed.

According to this item, since an excessive support display for the user is not presented, the operability of the remote operation device is improved. In addition, since the excessive support display for the user is not superimposed on the on-site video, the processing load of the remote operation device is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A remote operation device for enabling a user to remotely operate a work machine, the remote operation device comprising a memory storing instructions, and at least one processor configured to execute the instructions to:

determine visibility of a work area where the work machine is located;

select one visibility rank of a plurality of visibility ranks based on the visibility of the work area, one or more support displays to be superimposed on a video of the work area captured by the work machine, wherein each of a plurality of support displays that can be superimposed on the video of the work area is associated with one or more of the plurality of visibility ranks, and the determined one or more support displays are associated with the selected visibility rank; and present, to the user, the video of the work area on which the one or more support displays are superimposed.

2. The remote operation device according to claim 1, wherein the plurality of support displays that can be superimposed on the video of the work area include a first display virtually indicating a real sign and a second display for calling attention of the user, and the at least one processor is further configured to execute the instructions to select the first display and not to select the second display when the selected visibility rank is a predetermined visibility rank.

3. The remote operation device according to claim 1, wherein a plurality of support displays that can be superimposed on the video of the work area include at least one or more of:

a display of a planned travel route of the work machine;

a display related to a moving speed of the work machine;

a display of an area of dust generation;

a display for calling attention to an accident;

a display for calling attention to appearance of an animal;

a display for calling attention to passing another oncoming work machine;

a display of a virtual traffic signal; and a display of a virtual sign.

4. The remote operation device according to claim 1, wherein a plurality of support displays that can be superimposed on the video of the work area include a display of a virtual traffic signal.

5. The remote operation device according to claim 1, wherein a plurality of support displays that can be superimposed on the video of the work area include a display of a virtual sign, and the display of the virtual sign has an appearance of a sign used in a country selected by the user.

6. The remote operation device according to claim 1, wherein the at least one processor is further configured to execute the instructions to determine the visibility for each of a plurality of nodes set in the work area where the work machine is located.

7. The remote operation device according to claim 1, wherein the work machine is a work machine that can travel.

8. A non-transitory storage medium storing a program for causing a computer to function as the remote operation device according to claim 1.

9. A method for presenting a video for remotely operating a work machine to a user, the method comprising:

determining visibility of a work area where the work machine is located;

selecting one visibility rank of a plurality of visibility ranks based on the visibility of the work area, determining, one or more support displays to be superimposed on a video of the work area captured by the work machine, wherein each of a plurality of support displays that can be superimposed on the video of the work area is associated with one or more of the plurality of visibility ranks, and the determined one or more support displays are associated with the selected visibility rank; and presenting, to the user, the video of the work area on which the one or more support displays are superimposed.

* * * * *